March 17, 1942.  E. H. LOCKWOOD  2,276,661
OVEN HEATING UNIT
Filed May 8, 1940  2 Sheets-Sheet 1

WITNESSES:

INVENTOR
Edwin H. Lockwood.
BY
ATTORNEY

March 17, 1942.   E. H. LOCKWOOD   2,276,661
OVEN HEATING UNIT
Filed May 8, 1940   2 Sheets-Sheet 2
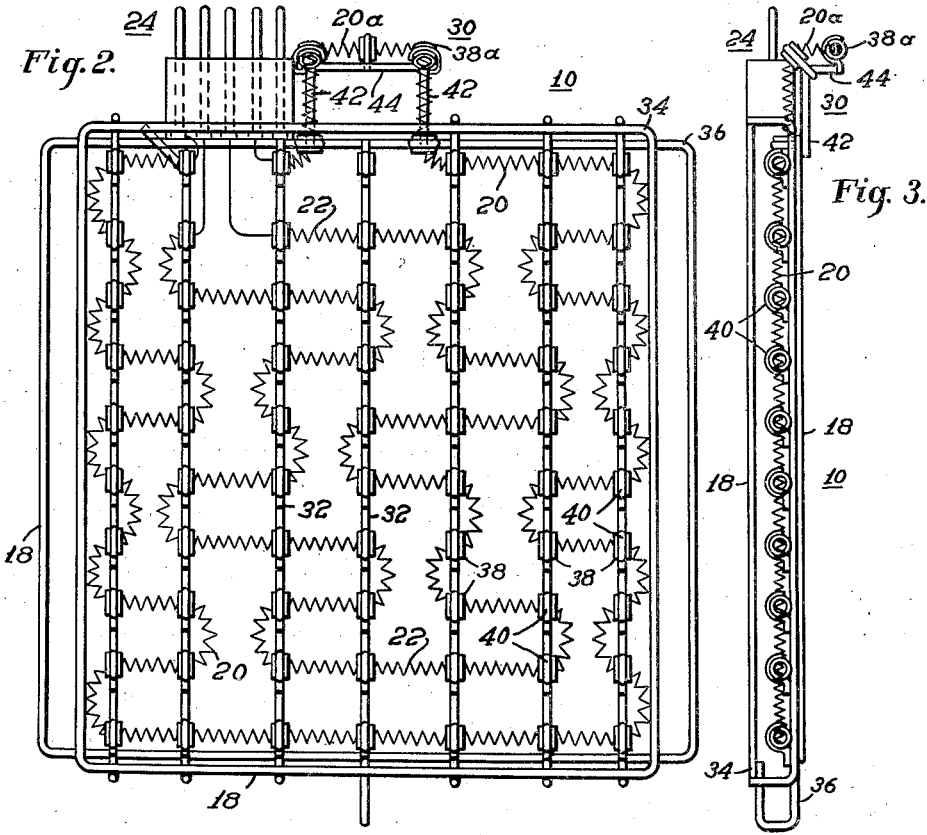
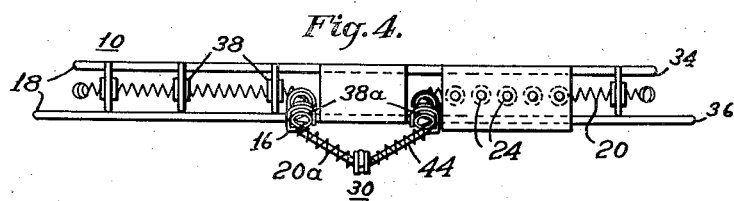
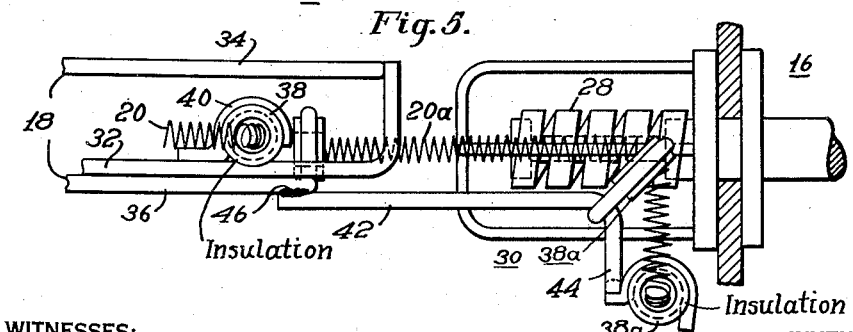
WITNESSES:
INVENTOR
Edwin H. Lockwood.
BY
ATTORNEY Patented Mar. 17, 1942

2,276,661

UNITED STATES PATENT OFFICE 2,276,661

OVEN HEATING UNIT

Edwin H. Lockwood, Mansfield, Ohio, assignor to Westinghouse Electric & Manufacturing Company, East Pittsburgh, Pa., a corporation of Pennsylvania Application May 8, 1940, Serial No. 334,091

3 Claims. (Cl. 219—35)

My invention relates to heating units and more particularly to a heating unit and control for range ovens.

Range ovens known to the art utilize thermostats associated therewith for regulating the temperatures thereof, which have their thermal responsive elements positioned within the oven. Such elements are usually actuated by the heat within the oven. However, due to the usual relatively remote position of the thermal responsive elements within the ovens with respect to the heating units, the regions immediately surrounding such elements do not heat at the same rate as the center of the oven where the cooking is done. This results in a wide difference in temperatures in different parts of the oven as the oven heating element "cycles" at a given setting of the thermostat, and in a large overtravel or overheating, when initially heating the oven, before the thermostat increases in temperature to its operating value.

After considerable effort it was found that this undesirable initial overheating and wide differences in such oven temperatures could be eliminated by running an extension of the top oven heating unit close to the thermal responsive element of the thermostat so as to maintain the temperature of such element in direct ratio to the oven temperature.

It is, therefore, an object of my invention to provide a heating unit for a range oven which has an extended portion thereof adapted to be located close to the thermal responsive element of the oven temperature controlling thermostat.

A further object of my invention is to provide a heating unit for an oven having a rearwardly extending portion extending therefrom for fitting alongside of and around a thermostat extending into the oven.

Another object of my invention is to provide a heating unit for a range oven which is adapted to cooperate with the controlling thermostat thereof so as to heat the thermal element of such thermostat substantially in direct ratio with the central portion of the oven.

Other objects of my invention will either be pointed out specifically in the course of the following description of a device embodying my invention, or will be apparent from such description.

In the accompanying drawings:

Figs. 2, 3 and 4 are top, side and rear views, respectively, of the heating unit embodying my invention, and Fig. 5 is an enlarged partial side view illustrating the heating unit shown in Fig. 2 associated with the oven thermostat.

Figure 1:
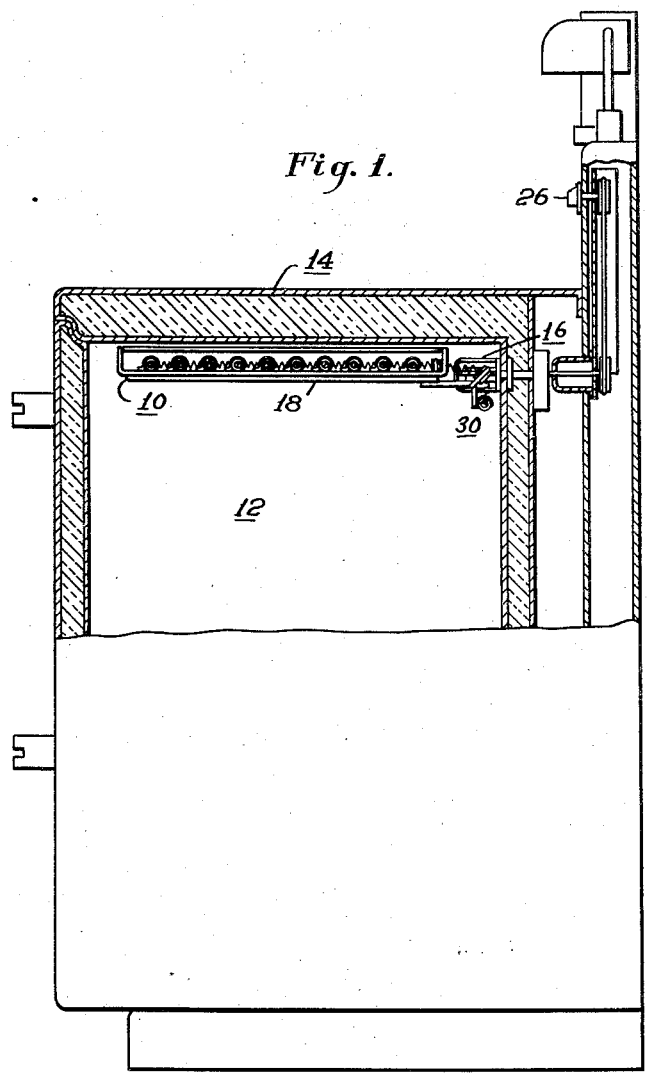
Figure 1 is a view partially in elevation and partially in section, of a range having a device embodying my invention incorporated therewith.

Referring to the accompanying drawings, in which like reference characters indicate like parts in the figures, I show a heating unit 10 adapted to be positioned within an oven 12 of say a range structure 14 so as to be associated, in accordance with the present invention, with an oven thermostat 16, comprising a supporting structure 18, a plurality of heating elements 20 and 22, and prong means or terminals 24 for attaching such unit to an electric circuit (not shown).

The range 14, including the oven 12, illustrated in Fig. 1, may be of any desired construction well-known to the art, with the oven thermostat 16 extending into the oven 12 near the heating unit 10. Suitable flanges or glides (not shown) are preferably attached to the upper portion of the side walls of the oven 12 to permit the upper heating unit 10 to be readily slid into or out of such oven in a well-known manner. The thermostat 16 is adapted to be controlled by a suitable operating knob 26 in any well-known manner, preferably as disclosed and claimed by E. K. Clark in United States Letters Patent Nos. 2,178,065 and 2,178,066, assigned to the assignee of this application.

The thermostat 16 is, in this instance, positioned outside the rear wall of the oven 12 and has the thermal responsive element 28 thereof positioned within the oven close to the heating unit 10. The thermostat is also, in this instance, positioned relatively near the upper wall of the oven so as not to limit or restrict the available size of the oven 12. With the thermostat 16 located in such a position it is apparent that, unless the present invention is employed, the thermal-responsive element 28 thereof, which extends into the oven, will not heat in direct ratio with the central portion of the oven 12, but will heat and cool at a slower rate than the oven proper. Accordingly, there will be a large overheating of the oven on the initial operation thereof, with a continued large amplitude of operation. However, by utilizing the heating unit 10, to provide supplemental heat for the thermal responsive element 28 of thermostat 16, as hereinafter described, such thermostat may be made to operate substantially in direct thermal relation with the temperature of the central portion of the oven 12.

The heating unit 10 comprises, in this instance, a light open-grid type supporting structure 18, a plurality of heating elements 20 and 22 insulatedly attached to such structure, a rearwardly extending portion 30 adapted to thermally cooperate with the thermal-responsive element 28 of thermostat 16 and suitable prong or plug means 24. The supporting structure 18 comprises a plurality of substantially parallel longitudinally extending spaced wire members 32 rigidly attached to substantially rectangular shaped frame members 34 and 36. The member 36 is wider than the member 34 and is preferably adapted to cooperate with familiar glide or supporting members (not shown) upon the side walls of the oven 12 to support such heating unit within the oven, although the particular form of mounting is not material to my present invention.

The heating elements 20 and 22 are wound or positioned irregularly upon the supporting structure 18, with the heating element 20 being located about the outer edge thereof and the element 22 located within the central portion thereof. The elements 20 and 22 are attached to and insulated from the structure 18 by means of insulating grommets or eyelets 38 which in turn are rigidly attached to the parallel supporting members 32 by means of a metallic bracket 40 rigidly attached thereto. (See Fig. 5.)

The rearwardly extending portion 30 of the heating unit comprises two rearwardly extending substantially parallel arm portions 42 and a dependent yoke or V-shaped member 44. The arms 42 are, in this instance, formed integral with the yoke member 44. However, if desired, they may be formed independent thereof. The inner ends of the arms 42 are attached to the lower rectangular frame member 36, say by welds 46, while the yoke or V-shaped portion 44 is integral with and depends from the free ends of such arms. Additional grommets 38a are attached to portion 30, one on each of the arms 42 and one at the lower portion of the yoke 44. Such grommets permit a heating element 20 to be positioned upon the rearwardly extending portion 30. A portion 20a of the outer heating element 20 is adapted to be formed about the arms 42 and yoke 44 and is insulatedly supported by the grommets 38a. The portion 20a of the heating element 20 is adapted to extend substantially over the arms 42 and down along the depending yoke or V-shaped portion 44 so as to be positioned in direct thermal communication with the thermal-responsive element 28 and to actuate such element in direct response to the heating of the oven 12.

It is, therefore, obvious that the rearwardly extending portion 30 with the heating element portion 20 insulatedly attached thereto forms a box or cage which is adapted to fit closely about the thermal responsive element 28 of thermostat 16.

It is to be understood that the heating element 20a is designed to be of such character as to supply such necessary additional heat to the thermal element 28 as is required to make it respond to anticipate the temperature at the center of the oven. This arrangement permits the thermostat to maintain the desired oven temperature within desirably narrow limits.

The prong portion 24 comprises, in this instance, a plurality of finger members which are adapted to engage within a suitable receptacle (not shown) rigidly attached to the rear wall of the oven 12 in a well-known manner so as to connect the heating unit 10 to a power supply (not shown).

It follows that, with the rearwardly extending portion 30, including portion 20a of heating element 20, being adapted to be positioned about the thermal element 28 of thermostat 16, such thermostat will be heated to a temperature above that which it would normally attain if it received heat primarily from the oven 12. It is, therefore, obvious that such thermostat will operate to deenergize the heating element upon the initial heating thereof substantially quicker than it would otherwise. Accordingly, it follows that the initial overtravel or heating of the oven will be eliminated. Further, with the heating element 20a being positioned about the thermostat and in direct thermal communication therewith, the amplitude of operation of the thermostat with respect to the temperature of the central portion of the oven will be greatly reduced. The temperatures of various parts of the oven 12 will thus be more evenly distributed about the desired temperature set by an operator.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

I claim as my invention:

1. In combination, a thermostat and a heating unit for a range oven, comprising a rack-like supporting structure and a heating element insulatedly attached thereto, adapted to cooperate with said thermostat, the thermal responsive element thereof extending into the oven, said unit having a rearwardly extending portion for fitting about the thermal responsive element comprising two arms attached to the supporting structure, a yoke member joining the free ends of such arms, and a portion of the heating element insulatedly attached to the arms and yoke for supplementally heating the thermal responsive element.

2. In combination, a thermostat and a heating unit for a range oven, comprising a rack-like supporting structure and a heating element insulatedly attached thereto, adapted to cooperate with said thermostat, the thermal responsive element thereof extending into the oven, said unit having a rearwardly extending portion for fitting about the thermal responsive element thereof comprising two substantially parallel arms attached to the supporting structure and having free ends, such arms being spaced apart so as to fit one on either side of the thermal responsive element as the unit is placed within the oven, a depending yoke member attached to the free ends of the arms for passing beneath such thermal responsive element, and a portion of the heating element being insulatedly attached to the arms and yoke so as to pass about the thermal responsive element for controlling the operations of the thermostat.

3. In combination, a thermostat and a heating unit for a range oven, comprising a rack-like supporting structure and a plurality of heating elements insulatedly attached thereto, adapted to cooperate with said thermostat, the thermal responsive element thereof extending into the oven, said unit having a rearwardly extending portion for fitting about the thermal responsive element thereof, comprising two substantially parallel arms attached to the supporting structure, substantially parallel thereto having free ends, such arms being spaced apart so as to fit one on either side of the thermal responsive element as the unit is placed within the oven, a depending yoke member attached to the free ends of the arms for passing beneath such thermal responsive element, and a portion of one of the heating elements being insulatedly attached to the arms and yoke so as to pass about the thermal responsive element for controlling the operations of the thermostat.

EDWIN H. LOCKWOOD.